United States Patent
Wolf

(10) Patent No.: US 6,296,290 B1
(45) Date of Patent: Oct. 2, 2001

(54) PORTABLE LOADING RAMP FOR A PICKUP TRUCK

(76) Inventor: Nathan Wolf, 8830 -33rd Ave. SE., Wishek, ND (US) 58495

( * ) Notice: Subject to any disclaimer, the term of this patent is extended or adjusted under 35 U.S.C. 154(b) by 0 days.

(21) Appl. No.: 09/302,501

(22) Filed: Apr. 30, 1999

(51) Int. Cl.$^7$ ............... B62C 1/06; B62D 25/00; B60P 1/00; B60R 9/00; B60R 11/00
(52) U.S. Cl. ............ 296/61; 296/26.1; 296/26.11; 414/462; 414/537; 224/521
(58) Field of Search ............ 296/26.08, 26.09, 296/26.1, 26.11, 61; 414/462, 537; 224/403, 405, 521

(56) References Cited

U.S. PATENT DOCUMENTS

| | | | |
|---|---|---|---|
| 3,339,968 | * | 9/1967 | Hall ............................................. 296/61 |
| 3,352,440 | * | 11/1967 | Wlison ................................. 414/537 |
| 4,647,270 | * | 3/1987 | Maloney ................................ 414/537 |
| 4,700,421 | * | 10/1987 | Gladney et al. ...................... 414/537 |
| 5,156,432 | * | 10/1992 | McCleary .............................. 296/61 |
| 5,342,105 | * | 8/1994 | Miles ....................................... 296/61 |
| 5,649,732 | * | 7/1997 | Jordan et al. ........................ 296/26.1 |
| 5,752,636 | * | 5/1998 | Manley ............................... 296/26.11 |
| 5,950,890 | * | 9/1999 | Darby .................................... 224/403 |

* cited by examiner

Primary Examiner—D. Glenn Dayoan
Assistant Examiner—Hilary Gutman
(74) Attorney, Agent, or Firm—David A. Lingbeck

(57) ABSTRACT

A portable loading ramp for a pickup truck including an elongate hitch mount which is removably attached to a hitch on a pickup truck, and further including first and second ramp members which are hingedly mounted upon the elongate hitch mount, and also including a vehicle support which includes a sleeve support member, a sleeve member attached to the sleeve support member, and a support arm lockably extendable in the sleeve member and having an end which either attaches to the small vehicle to secure the vehicle on the truck box or securely supports the back end of the small vehicle above the floor of the truck box.

4 Claims, 3 Drawing Sheets

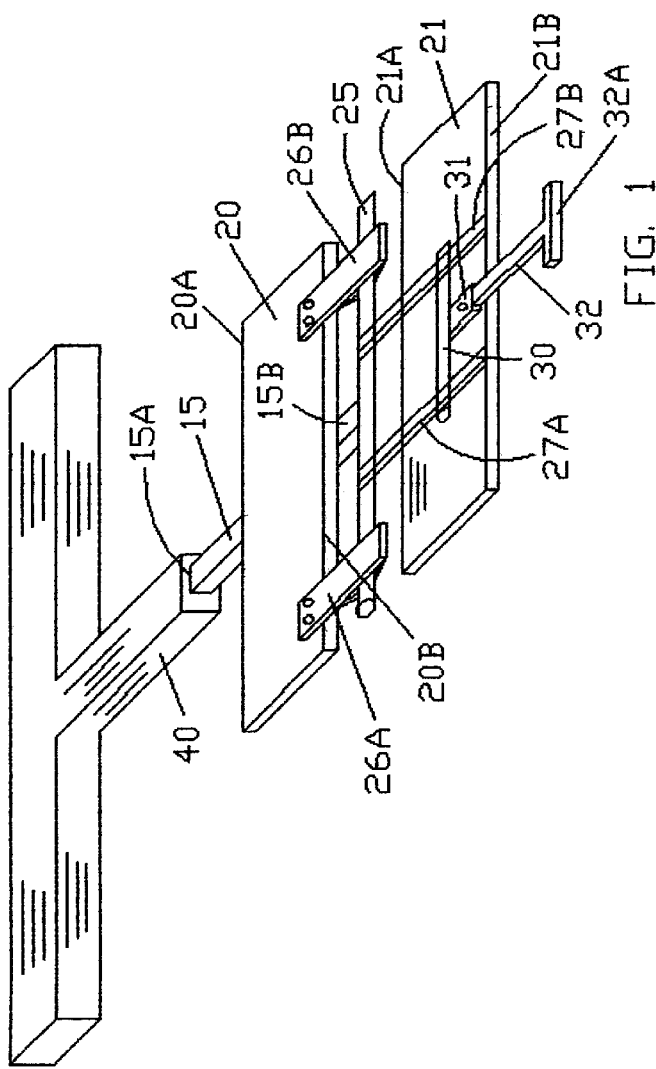
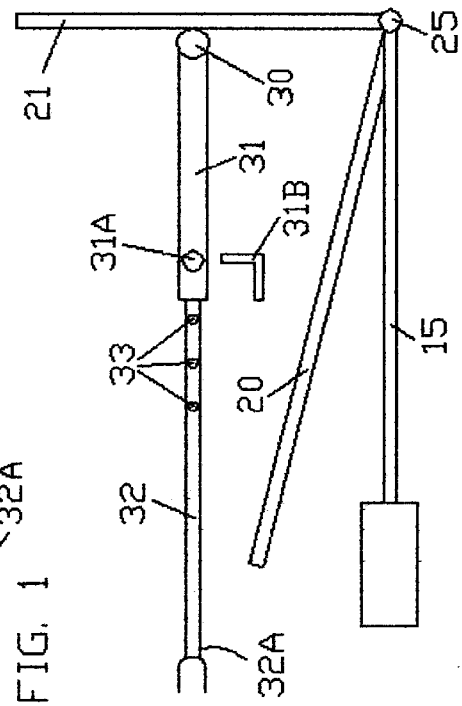

PORTABLE LOADING RAMP FOR A PICKUP TRUCK

BACKGROUND OF THE INVENTION

This invention relates to a portable loading ramp for a pickup truck which can be easily and quickly mounted to a hitch on a pickup truck for loading small vehicles.

Pickup trucks have boxes with the floors being substantially elevated above the ground surface, and in order to load heavy equipment such as snowmobiles and ATVs onto the truck box, the user generally would have to back the pickup truck up to a mound or an elevated piece of land such that the height of the mound or elevated piece of land is relatively the same as the height of the floor of the truck box so that the user can drive the vehicle onto the truck box. On the other hand, the user would carry a couple of planks of wood along in the truck box and would slide the planks out of the truck box and create a ramp from the ground up to the truck box. There have been other devices used to create ramps for pickup trucks.

One known prior art is a RAMP FOR LOADING SMALL MOTORIZED VEHICLES ON PICKUP TRUCKS, U.S. Pat. No. 4,700,421, issued on Oct. 20, 1987 and invented by Tommy C. Gladney et al and comprising a flexible support sheet adapted to extend from the truck box and the ground, means to secure the support sheet and the truck box the ground, and an elongate tensioning member for supporting the support sheet.

Another known prior art is a RAMP AND ENDGATE FOR PICKUP TRUCK, U.S. Pat. No. 5,342,105, issued on Aug. 30, 1994 and invented by Mark R. Miles and comprising a front and rear sections pivotally connected together and supported upon a short transverse support frame.

Another known prior art is a PICKUP TRUCK LOADING RAMP, U.S. Pat. No. 4,795,304, issued on Jan. 3, 1989 and invented by James D. Dudley and comprising a pair of hingedly connected ramp panels and a plurality of legs.

Another known prior art is a PICKUP TRUCK BED EXTENDER, RAMP AND TAILGATE, U.S. Pat. No. 5,816,638, issued on Oct. 6, 1998 and invented by William Bryan Pool, III and comprising two side frame members, a gate member, a latching means, and a pivoting control means.

Another known prior art is a COMBINATION PICKUP TRUCK BED EXTENDER-FOLDABLE RAMP, U.S. Pat. No. 5,752,800, issued on May 19, 1998 and invented by Darryl Brincks et al and comprising a mounting plate, an extension plate mounted to the mounting plate, collapsible sections, a plurality of side bed extenders, and a plurality of latches.

Another known prior art is an EXTENDABLE SUPPORT SYSTEM, U.S. Pat. No. 5,803,523, issued on Sep. 8, 1998 and invented by Jeffrey L. Clark et al and comprising a plurality of support members, a plurality of stop tabs, and a plurality of side rails.

Another known prior art is a RETRACTABLE RAMP ASSEMBLY FOR PICK-UP TRUCK, U.S. Pat. No. 4,624,619, issued on Nov. 25, 1986 and invented by Michael L. Uher and comprising a ramp means having a plurality of ramp sections, hinge means, limit means, pin locking means, and stop means.

None of the prior describes nor suggests a portable loading ramp of the present invention.

SUMMARY OF THE INVENTION

The present invention relates to a portable loading ramp for a pickup truck which includes a hitch mount detachably mounted to a hitch receiver on a pickup truck, first and second ramp members which are hingedly attached to each other at one end of the hitch mount with the second ramp pivotally extending to the ground and the first ramp pivotally extending to the truck box, and a vehicle support assembly hingedly mounted to the second ramp for elevating a rear portion of the small vehicle above the floor of the truck box to allow the user to warm up the small vehicle prior to driving the small vehicle off the truck box and also for securing the small vehicle in the truck box.

One known objective of the present invention is to provide a portable loading ramp for a pickup truck which is small, easy to use and easy to store out of the way in the truck box.

Another known objective of the present invention is to provide a portable loading ramp for a pickup truck which allows the user to elevate the back end of the small vehicle above the floor of the truck box so that the user can allow the small vehicle to warm up prior to disembarking from the pickup truck.

Yet, another known objective of the present invention is to provide a portable loading ramp for a pickup truck which allows the user to unmovably secure the small vehicle on the truck box.

Further objectives and advantages of the present invention will become apparent as the description proceeds and when taken in conjunction with the accompanying drawings wherein:

BRIEF DESCRIPTION OF THE DRAWINGS

FIG. 1 is a top perspective view of the portable loading ramp for a pickup truck mounted to the hitch receiver of a pickup truck.

FIG. 2 is a side elevational view of a second embodiment of the portable loading ramp for a pickup truck.

DETAILED DESCRIPTION OF THE INVENTION

Figure 3:
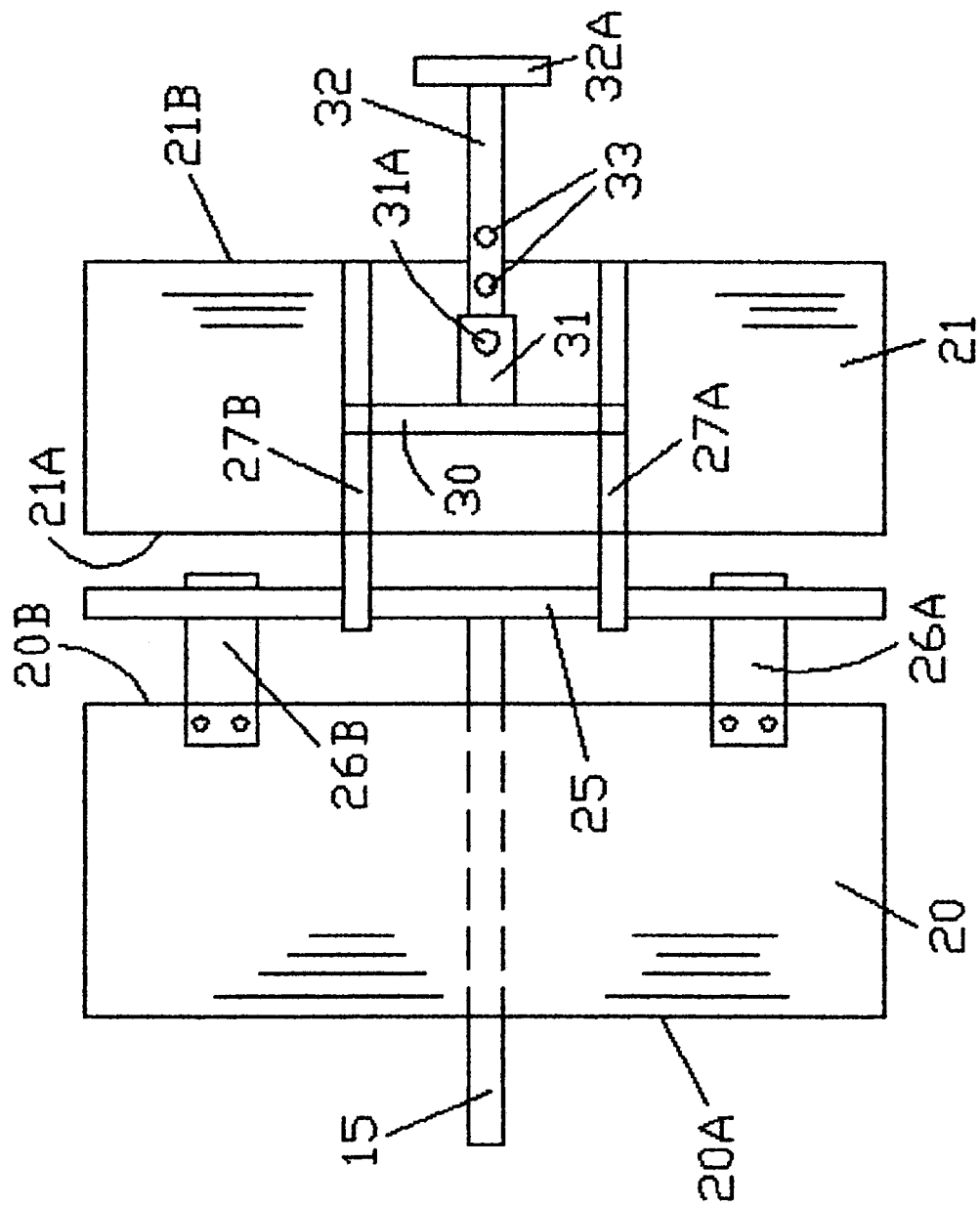
FIG. 3 is a top plan view of the portable loading ramp showing the vehicle support assembly.
Figure 4:
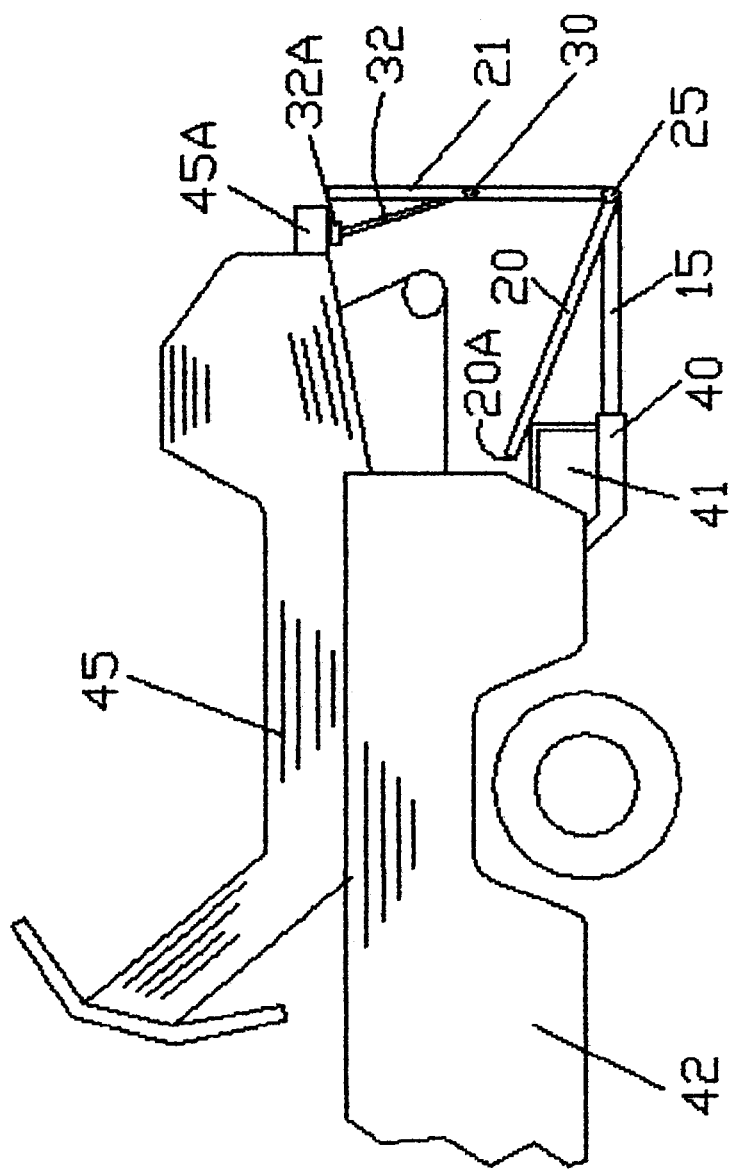
FIG. 4 is a side elevational view of the portable loading ramp being used for loading a snowmobile.

Referring to the drawings in FIGS. 1–4, in particular, the portable loading ramp for a pickup truck comprises an elongate hitch mount 15 which is cantilevered with a first end 15A of the hitch mount 15 being removably, securely and conventionally fastened in the hitch receiver 40 on a pickup truck 42 and with the elongate hitch mount 15 extending rearwardly generally in the same plane as the hitch receiver 40 and generally horizontally above the ground, and further comprises a first ramp member 20 having a first 20A and second end 20B, a second ramp member 21 also having a first 21A and second end 21B and being hingedly attached with a hinge means to the first ramp member 20. The hinge means includes an elongate support member 25 which is disposed perpendicular to the hitch mount 15 and which is conventionally and securely attached at an intermediate portion thereof to the second end 15B of the hitch mount 15 which is opposite to the cantilevered first end 15A, and further includes a plurality of mounting brackets 26A–B,27A–B, two 26A–B of which are securely and conventionally fastened to the second end 20B of the first ramp member 20 and are spaced apart from one another, and another two 27A–B of which are securely and conventionally fastened to the first end 21A of the second ramp member 21. The mounting brackets 26A–B,27A–B are rotatably mounted about the elongate support member 25. The first ramp member 20 and the second ramp member 21 are pivotable relative to the elongate support member 25 and to the hitch mount 15 and are pivotable independently of one another with the second ramp member 21 capable of pivoting above and below the hitch mount 15.

The portable loading ramp also comprises a vehicle support assembly having an extendable support member which includes a sleeve support member 30 which is pivotally and conventionally mounted perpendicular to the two mounting brackets 27A–B on the top of the second ramp member 21, and which further includes a sleeve member 31 with a first end securely and conventionally attached to an intermediate portion of the sleeve support member 30 and also having an open second end which is adapted to receive a support arm 32 which has a plurality of holes 33 extending through its wall and spaced along a length thereof. The support arm 32 has a first end 32A which is engageable to a back end 45A of a small vehicle 45 like that of a snowmobile once the small vehicle 45 is loaded onto the truck box. The support arm 32 can be adjusted relative to the sleeve member 31 by sliding the support arm 32 in or out of the sleeve member 31 and by securely locking the support arm 32 at the desired extension with a locking pin 31B which is used to extend through a hole 31A in the side wall of the sleeve member 31 and through one of the selected holes 33 in the support arm 32 which has two embodiments, one of which includes a T-shaped first end which is adapted to support the back end 45A of a snowmobile 45, in particular, and the other of which includes a yoked first end which is adapted to easily connect to a hitch of an ATV, in particular, with a hitch pin.

In use, the portable loading ramp is set up by the user extending and securing the first end 15A of the elongate hitch mount 15 into the hitch receiver 40 on a pickup truck 42 and then by pivoting the second ramp 21 downwardly with the second end 21B thereof resting upon the ground surface and by pivoting the first ramp member 20 so that the front end 20A thereof rests upon either the bumper 41 or the back edge of the truck bed. The user can load the small vehicle 45 upon the truck bed by simply driving the vehicle upon the second 21 and first ramp members 20. Once the vehicle is loaded, the user can further secure the vehicle if it is a snowmobile by pivoting the second ramp member 21 upwardly into a generally vertical position and by lifting the back end 45A of the snowmobile 45 off the truck bed and placing the T-shaped first end 32A at the back end 45A of the snowmobile 45 to support and secure the back end 45A of the snowmobile 45 off the truck bed. The second ramp member 21 is essentially secured in a generally vertical position above the elongate hitch mount 15 by a plurality of conventional strap members (not shown) which removably attach to the truck box and to the second ramp member 21. If the vehicle is an ATV, for example, the user would removably connect the yoked first end 32A to the hitch on the ATV with a hitch pin.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A portable loading ramp for a pickup truck comprising:

an elongate hitch mount being adapted to be removably and securely connected to a hitch;

a first ramp member having a front end and a back end which is hingedly disposed upon said elongate hitch mount;

a second ramp member having a back end and a front end which is hingedly disposed upon said elongate hitch mount; and a vehicle support assembly mounted upon said second ramp member, said vehicle support assembly including an extendable support member, said extendable support member including a sleeve support member which is pivotally mounted to said mounting brackets on said second ramp member, a sleeve member having a first end securely attached to said sleeve support member and having an open second end, and also including a support arm having a first end and being slidably and lockably extended in said sleeve member to securely support a small vehicle.

2. A portable loading ramp for a pickup truck as described in claim 1, wherein said support arm has a second end which is T-shaped and which is contactable to a rear portion of the small vehicle for supporting the small vehicle above a floor of a truck box.

3. A portable loading ramp for a pickup truck as described in claim 1, wherein said support arm has a second end which is attachable to a hitch on the small vehicle, for securing the small vehicle upon the truck box.

4. A portable loading ramp for a pickup truck as described in claim 1, wherein said support arm is extendable in and out of said sleeve member and includes a plurality of holes extending through a wall thereof and being spaced along a length thereof for selective lockable extension of said support arm relative to said sleeve member.

* * * * *